Lee & Wren,
Steam Slide Valve.

No. 84,064. Patented Nov. 17, 1868.

2 Sheets—Sheet 1.

Witnesses:
Wm. A. Morgan.
G. C. Cotton.

Inventors:
R. R. Lee.
G. A. Wren.
per Munn & Co
Attorneys

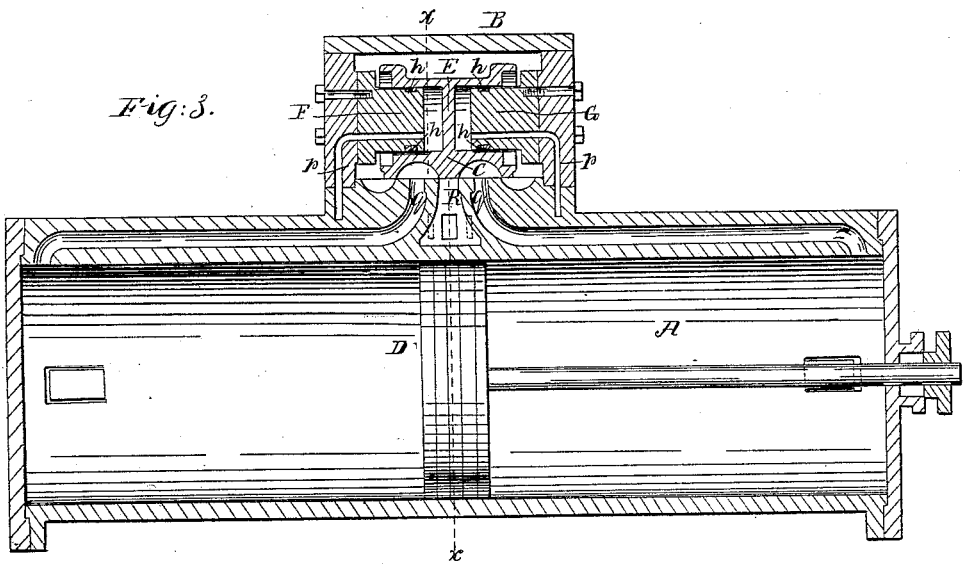
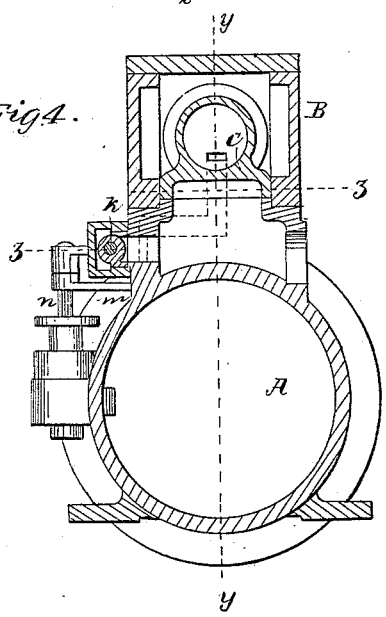

UNITED STATES PATENT OFFICE.

RALPH R. LEE AND GEORGE H. WREN, OF MAHANOY CITY, PA., ASSIGNORS TO THEMSELVES AND JOHN C. NORTHALL, OF SAME PLACE.

IMPROVEMENT IN VALVES FOR STEAM-ENGINES.

Specification forming part of Letters Patent No. 84,064, dated November 17, 1868.

*To all whom it may concern:*

Be it known that we, RALPH R. LEE and GEORGE H. WREN, of Mahanoy City, in the county of Schuylkill and State of Pennsylvania, have invented a new and useful Improvement in Steam Pumping-Engines; and we do hereby declare that the following is a full, clear, and exact description thereof, which will enable others skilled in the art to make and use the same, reference being had to the accompanying drawings, forming part of this specification, in which—

Figure 1:
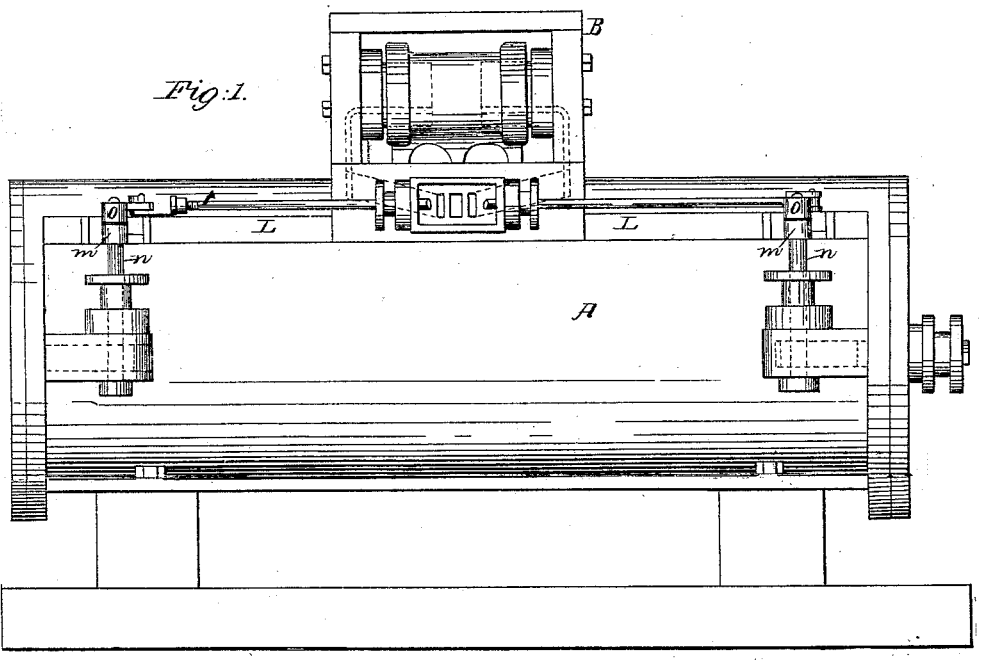
Figure 2:
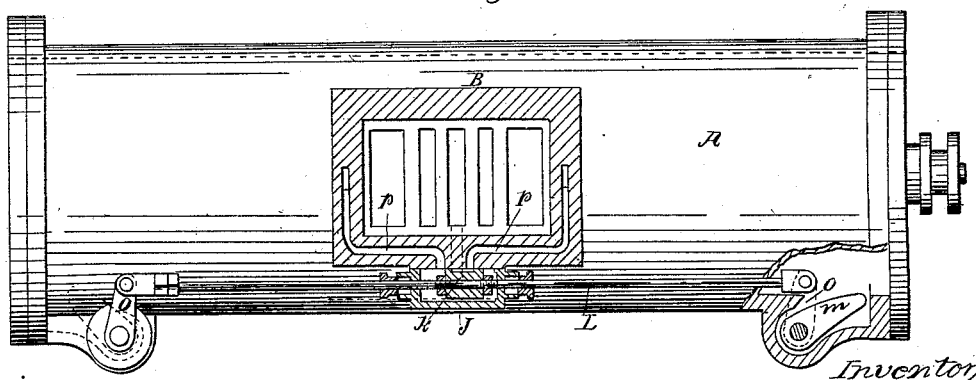

Figure 1, Sheet I, is a longitudinal elevation or outside view, with the cap of the steam-chest off. Fig. 2 is a horizontal longitudinal section through the line $z\ z$ of Fig. 4. Fig. 3 Sheet II, is a longitudinal section of Fig. 4 through the line $y\ y$. Fig. 4 is a cross-section of Fig. 3 through the line $x\ x$.

Similar letters of reference indicate like parts.

This invention relates to the manner in which the valves of pumping and other engines are operated; and it consists in the construction of the main valve and steam-chest, and the manner in which steam is admitted thereto for the movement of the valves, as will be hereinafter described.

A represents the cylinder of the engine. B is the steam-chest. C is the main valve. D is the piston. The main valve C contains a double cylinder, having a partition-plate, E, in its center, which divides the cylinder into two parts.

To the right and left sides of the steam-chest two heads or stationary abutments are attached, (marked, respectively, F and G.) These heads are fitted to the parts of the valve-cylinder by steam-tight packing, as seen in the drawing at $h$.

J is a small steam-chest, which is attached to and in connection with the main steam-chest B, which chest is provided with a valve, $k$. This chest takes steam from the main steam-chest, and exhausts it into the main exhaust-passage.

L is a rod, which passes through the small steam-chest J, to which the valve $k$ is attached, as seen in Fig. 2.

The valve-rod L is given a longitudinal motion by the movement of the main piston in the cylinder A, through tappets $m$, which enter the cylinder at each end, so that they are moved by the piston near the termination of each stroke. These tappets are attached to short shafts $n$. $o$ represents an arm on each of these shafts, to which the ends of the valve-rod L are attached.

It will be seen that the small valve $k$ will be operated by this movement, and the steam-ports $p$ will be opened and closed accordingly. These ports or passages $p$ discharge steam directly, through the heads or abutments F and G, into the small cylinders of the main valve, as seen in the drawing. The steam thus admitted acts directly on the valve, by the partition E pressing it back and forth, thereby opening and closing the main steam-port $q$ and operating the engine.

R is the exhaust-port.

The main valve, although containing a double cylinder, as described, is a sliding valve, operating, with regard to the ports of the engine, the same as the ordinary D-valve. The main valve-seat is seen in Fig. 2, and the small valve-seat in the chest J is seen in Fig. 1.

The small valve is so operated that steam-cushions are formed in the main valve-cylinders, and the operation of the main valve is such that steam-cushions are formed for the pistons at the termination of each stroke, thus giving a soft and elastic motion to the engine, and preventing the shock and jar which occur from the sudden letting on of steam, and from other causes, and which have proved so destructive in engines of ordinary construction.

Although this valve-movement is more particularly designed for pumping-engines, we do not confine ourselves exclusively to that class of engines, but design applying it to all steam-engines where the advantages to be derived are considered sufficiently important to warrant the application.

Having thus described our invention, we claim as new and desire to secure by Letters Patent—

1. The main valve C, constructed substantially as herein shown and described.

2. The combination of the valve C with the stationary heads F G of the steam-chest, substantially as herein shown and described.

3. The arrangement of the valve C and heads F G with relation to the steam-ports $p$, substantially as herein shown and described.

The above specification of our invention signed by us.

RALPH R. LEE.
GEORGE H. WREN.

Witnesses:
F. B. DUHER,
E. F. WASHBURN.